United States Patent
Fukuhara

[11] Patent Number: 6,045,247
[45] Date of Patent: Apr. 4, 2000

[54] VEHICULAR LAMP

[75] Inventor: Kiyoshi Fukuhara, Shizuoka, Japan

[73] Assignee: Koito Manufacturing Co., Ltd., Tokyo, Japan

[21] Appl. No.: 09/037,876

[22] Filed: Mar. 10, 1998

[30] Foreign Application Priority Data

Mar. 10, 1997 [JP] Japan ..................................... 9-072737

[51] Int. Cl.[7] ....................................................... F21S 8/10
[52] U.S. Cl. ........................... 362/543; 362/521; 362/544
[58] Field of Search .................................... 362/543, 544, 362/546, 540, 521

[56] References Cited

U.S. PATENT DOCUMENTS

| | | | |
|---|---|---|---|
| 4,680,680 | 7/1987 | Iwaki et al. .......................... | 362/540 X |
| 5,001,610 | 3/1991 | Otaka .................................. | 362/543 X |
| 5,084,805 | 1/1992 | Goto .......................................... | 362/61 |
| 5,685,628 | 11/1997 | Feger et al. ......................... | 362/543 X |

*Primary Examiner*—Stephen Husar
*Attorney, Agent, or Firm*—Sughrue, Mion, Zinn Macpeak & Seas, PLLC

[57] ABSTRACT

A vehicular lamp with a first lamp housing and a second lamp housing adjacent to each other. The vehicular lamp further includes a lens having a first lens portion for the first lamp housing, and a second lens portion for the second lamp housing. The first and second lens portions are different in color from each other, and each include flanges which extend rearwardly from respective ends of the first and second lens portions. Each of the flanges includes an inner surface, an outer surface, and a rear end face. The first lens portion and the second lens portion are joined to each other by the outer surfaces of their flanges. A lamp body is provided adjacent the lens, and includes a border portion dividing the lamp body into the first and second lamp housings. Further, an elongated wall is formed in the border portion of the lamp body, and extends along an inner surface of the flange of the first lens portion, to a position which is more forward than a rear end face of that flange. Further, a rib is formed in the border portion of the lamp body, and extends in a direction that is substantially parallel with the elongated wall. The rib extends to a position adjacent the rear ends of the outer surfaces of the flanges which are joined together.

8 Claims, 6 Drawing Sheets

VEHICULAR LAMP

BACKGROUND OF INVENTION

The present invention relates to a vehicular lamp having two lamp housings which are adjacent to each other.

A vehicular lamp such as a rear combination lamp has plural lamp housings which are formed by lenses and a lamp body. A vehicular lamp is known in which such lenses are configured by a so-called joined lens wherein plural lenses of different colors are joined to one another.

Figure 6:
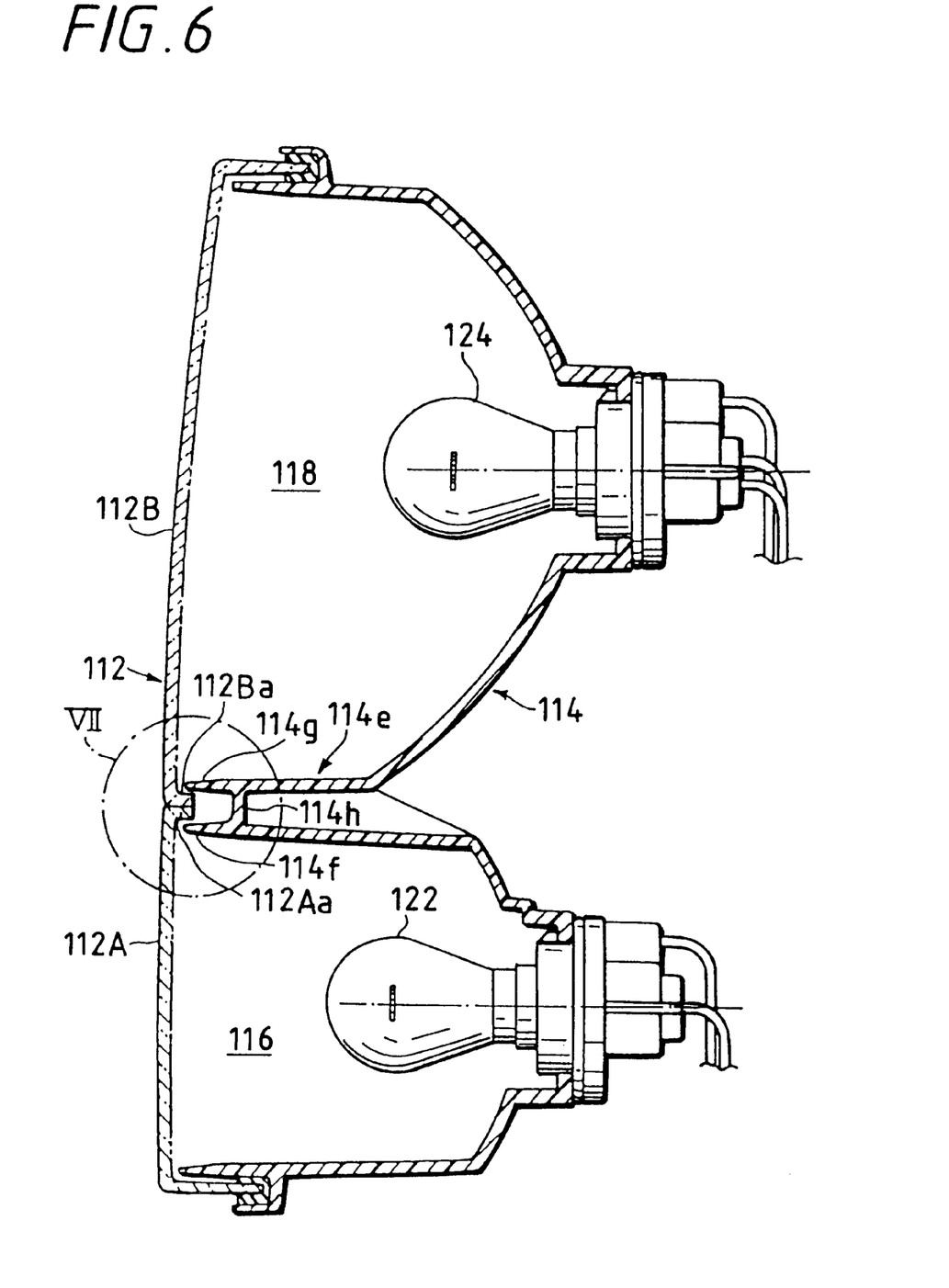
FIG. 6 is a view showing a conventional vehicular lamp.

Usually, a joined lens 112 is configured in the manner shown in FIG. 6. Flanges 112A*a* and 112B*a* which extend rearwardly are formed in ends of the lens portions where the two adjacent lens portions 112A and 112B are joined to each other. This joining is performed using the outer side faces of the flanges 112A*a* and 112B*a* as joining faces.

In the vehicular lamp having the thus configured joined lens 112, when light leakage between lamp housings 116 and 118 which are adjacent to each other occurs, light is emitted while being mixed with color light of a color which is different from a desired one. Therefore, such light leakage must be suppressed to a level as low as possible.

Conventionaly, therefore, a countermeasure such as shown in the figure is taken. A pair of elongated walls 114*f* and 114*g* are formed in a border portion 114*e* between the lamp housings 116 and 118 of the lamp body 114. The elongated walls extend along the inner side faces of the flanges 112A*a* and 112B*a*, to a position which is more forward than the rear end faces of the flanges. In this configuration, a direct light beam which is directed from a light bulb 122 of the one lamp housing 116 to the lens portion 112B of the other lamp housing 118, and that which is directed from a light bulb 124 of the other lamp housing 118 to the lens portion 112A of the one lamp housing 116, are blocked.

In this configuration, a bottom face 114*h* is formed in the border portion 114*e* of the lamp body 114 and between the pair of elongated walls 114*f* and 114*g* of the lamp body 114. In the case where the bottom face 114*h* is formed in proximity to the rear end faces of the flanges 112A*a* and 112B*a*, when the lamp is not lit, the bottom face 114*h* can be clearly seen from the forward side of the lamp, through the flanges 112A*a* and 112B*a*. Therefore, the bottom face 114*h* is usually formed at a position which is rearwardly separated by some distance from the rear end faces of the flanges 112A*a* and 112B*a*.

In the vehicular lamp thus constructed, it is difficult to suppress light leakage between the adjacent lamp housings to a sufficiently low level because of the following reasons.

Figure 7:
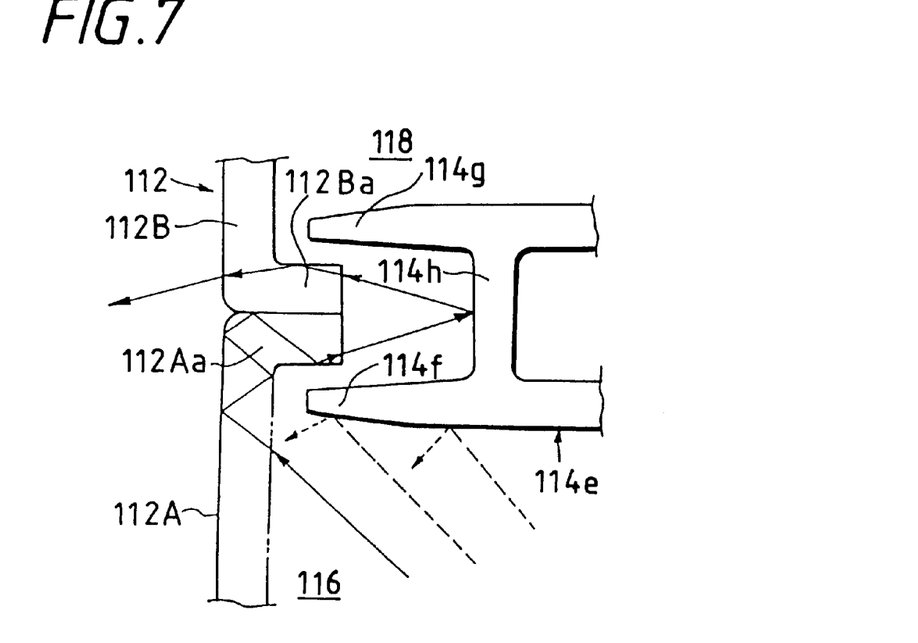
FIG. 7 is a detail view of the area VII in FIG. 6 and showing the function thereof.

As shown in FIG. 7 which is a detail view of the area VII in FIG. 6, for example, a direct light beam which is directed from the light bulb 122 of the one lamp housing 116 to the lens portion 112B of the other lamp housing 118 is blocked by the elongated wall 114*f* of the one lamp housing 116, so that suppression of light leakage can be attained to a certain degree. However, a light beam which is emitted from the light bulb 122 of the one lamp housing 116 and enters a portion in the vicinity of the end of the lens portion 112A of the one lamp housing 116 on the side of the joining faces cannot be blocked by the elongated wall 114*f* on the side of the one lamp housing 116.

Consequently, a light beam which has once entered the lens portion 112A to travel in the lens portion 112A outgoes from the rear end face of the flange 112A*a* and then travels in the following manner. The light beam is reflected by the bottom face 114*h* between the pair of elongated walls 114*f* and 114*g* of the lamp body 114, and then enters the lens portion 112B of the other lamp housing 118 through the rear end face of the flange 112B*a* of the lens portion. Thereafter the light beam forwardly outgoes from the lens portion 112B. As a result, when the light bulb 122 of the one lamp housing 116 is lit, there arises a light leakage phenomenon in which the lens portion 112B of the other lamp housing 118 slightly gleams.

Similarly, when the light bulb 124 of the other lamp housing 118 is lit, there arises a light leakage phenomenon in which the lens portion 112A of the one lamp housing 116 slightly gleams.

Figure 8:
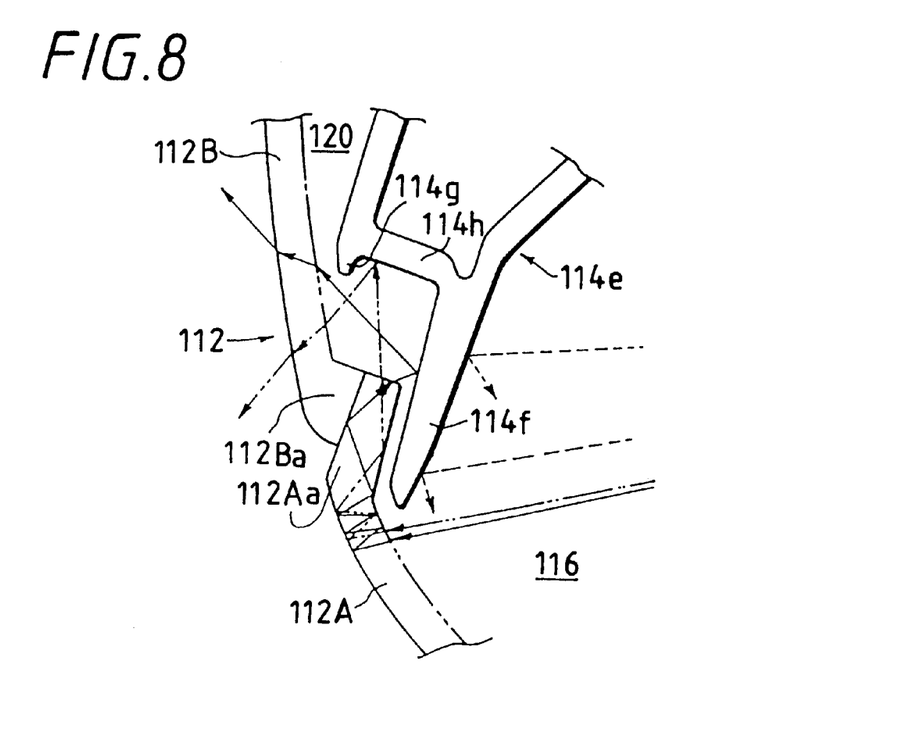
FIG. 8 is a view showing the function of the conventional vehicle lamp.

There are cases where the elongated wall 114*g* on the side of another adjacent lamp housing 120 must be formed as a low wall as shown in FIG. 8, and where the elongated wall 114*g* cannot be formed. In such cases, a light beam reflected by the bottom face 114*h* of the border portion 114*e* of the lamp body, or by the elongated wall 114*f* on the side of the one lamp housing 116 enters directly the lens face of the lens portion 112B of the other lamp housing 120, with the result that it is further difficult to suppress light leakage.

SUMMARY OF INVENTION

The invention has been conducted in view of the circumstances described above.

It is an object of the invention to provide a vehicular lamp in which two adjacent lamp housings are formed by a joined lens and a lamp body, wherein light leakage between the lamp housings can be sufficiently suppressed.

According to the invention, there is provided a vehicular lamp with a first lamp housing and a second lamp housing adjacent to each other, comprising: a lens including, a first lens portion for the first lamp housing, and a second lens portion for the second lamp housing, wherein the first and second lens portions are different in color from each other, and flanges which extend rearwardly are respectively formed at ends of the first and second lens portion, wherein the first lens portion and second lens are joined to each other at outer surfaces of the flanges; and a lamp body provided near the lens, the lamp body including, a border portion dividing the lamp body into the first and second lamp housing, an elongated wall formed in the border portion of the lamp body, the elongated wall extending along an inner surface of the flange of the first lens portion, to a position which is more forward than a rear end face of the flange, and a rib formed in the border portion of the lamp body, the rib extending in a direction that is substantially parallel with the elongated wall and to a position in the vicinity of rear ends of the outer surfaces of the lens joined together.

The "first and second lamp housings" may be formed so as to be adjacent to each other in any direction, for example vertical, lateral, and oblique directions.

It is a matter of course that the "second lamp housing" may be a usual lamp housing in which a light bulb is disposed. Alternatively, the second lamp housing may be a so-called dummy lamp housing in which no light bulb is disposed.

As described above, in the vehicular lamp of the invention, the two adjacent lamp housings are formed by the lens and the lamp body, and the elongated wall is formed in the border portion between the lamp housings of the lamp body. The elongated wall extends along the inner side face of the flange of the first lens portion constituting the first lamp housing, to a position which is more forward than the rear end face of the flange. Therefore, a direct light beam which is directed from the light bulb of the first lamp housing to the second lens portion constituting the second lamp housing is blocked by the elongated wall. In the border portion, the rib which extends in a direction that is substantially parallel with the elongated wall and to a position in the vicinity of the rear ends of the joining faces of the lens is further formed. Consequently, the invention can perform the following function.

A light beam which is emitted from the light bulb of the first lamp housing and enters a portion near the end of the first lens portion on the side of the joining faces (as described above, this light beam cannot be blocked by the elongated wall on the side of the first lamp housing) is blocked by the rib when the light beam travels in the first lens portion and then outgoes from the rear end face of the flange, or when the light beam is thereafter reflected by the elongated wall of the lamp body or by the bottom face between the elongated wall and the rib. As a result, light is prevented from entering the second lens portion.

According to the invention, therefore, in a lamp in which two adjacent lamp housings are formed by a lens and a lamp body, light leakage between the lamp housings can be sufficiently suppressed.

There is a possibility that a light beam, which is emitted from the rear end face of the flange of the first lens portion and then reflected by the tip end face of the rib, enters the second lens portion. However, the amount of such light is very small and does not produce a serious problem of light leakage. When the tip end face of the rib is formed into a wedge-like shape, such light leakage of a very small amount can be blocked.

The formation of the rib causes the tip end face of the rib to be seen from the forward side of the lamp through the flange. However, this does not present a problem of deterioration in the appearance quality because the tip end face has a very small area. In this case also, when the tip end face of the rib is formed into a wedge-like shape, the problem of deterioration in appearance quality can be surely solved.

The manner of disposing the "rib" is not particularly restricted as far as the rib extends in a direction that is substantially parallel with the elongated wall and to a position in the vicinity of the rear ends of the joining faces of the lens. When the rib extends so as to be substantially flush with the joining faces, however, incidence of light into the second lens portion can be effectively suppressed by the rib. When the second lamp housing is configured in the same manner as the first lamp housing, furthermore, a light beam from the light bulb of the second lens portion can be effectively suppressed from entering the first lens portion.

In this configuration, an elongated wall which forwardly extends along the inner side face of the flange of the second lens portion may be formed in the border portion of the lamp housings of the lamp body. In this case, a structure may be formed in which, because of restriction due to the structure of the lamp, the front end of the elongated wall must be set at a position which is more rearward than the front end of the rib. In such a structure, if the rib is not formed, a light beam reflected by the bottom face in the border portion of the lamp body or by the elongated wall of one of the lamp housings enters directly the lens face of the lens portion of the other lamp housing. According to the invention, the existence of the rib can prevent such light leakage from occurring.

Furthermore, the lens may be curved rearwardly from the first lens portion to the second lens portion. In this configuration, even when it is intended to form, in the border portion of the lamp housings of the lamp body, an elongated wall which forwardly extends along the inner side face of the flange of the second lens portion, there is a case where the elongated wall is inevitably formed as a low wall or such an elongated wall itself cannot be formed, in order to avoid interference with the lens face of the second lens portion. In such a case, the formation of the rib is particularly effective.

DETAILED DESCRIPTION OF PREFERRED EMBODIMENTS

Hereinafter, an embodiment of the invention will be described with reference to the drawings.

Figure 1:
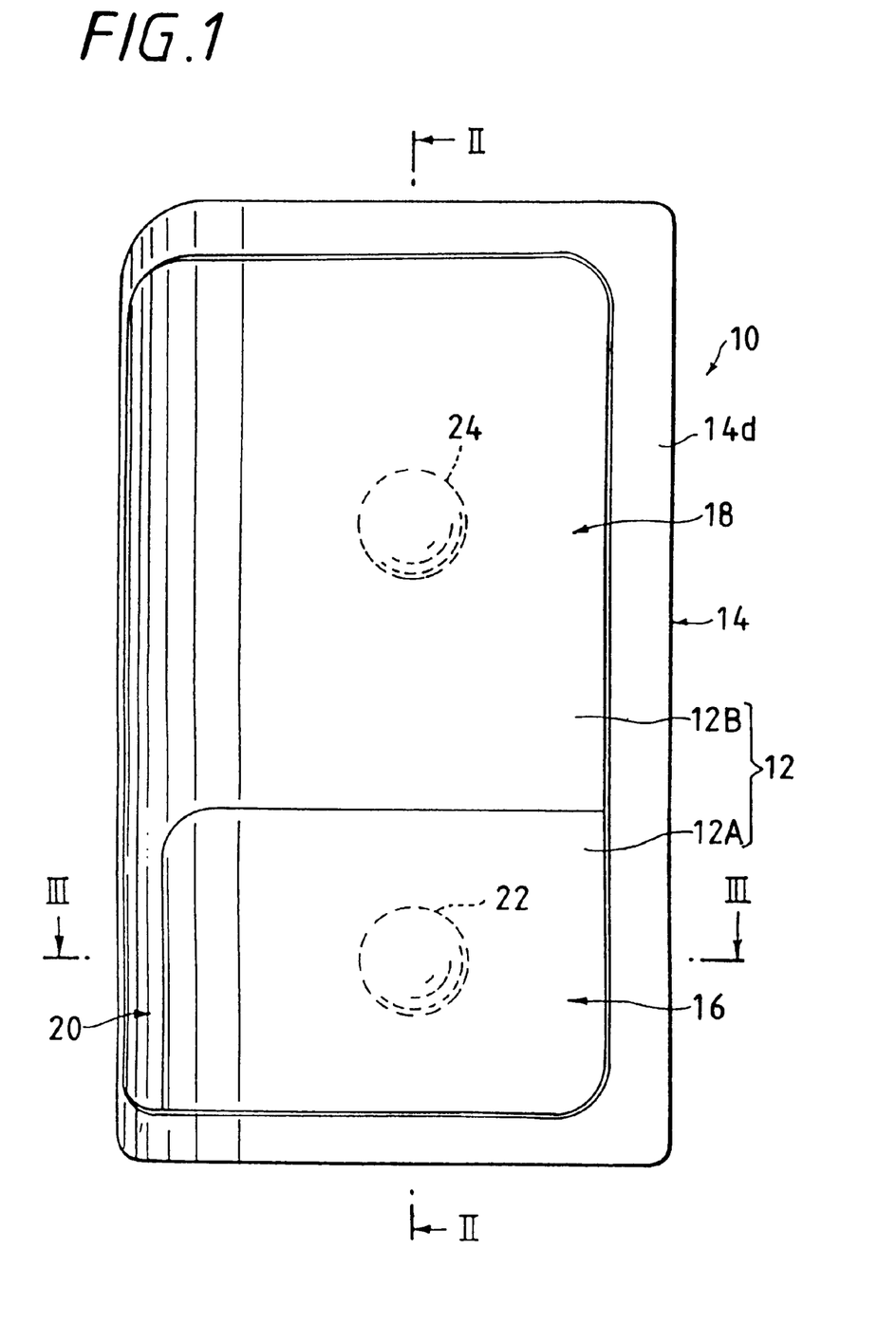
FIG. 1 is a front view showing a vehicular lamp which is an embodiment of the invention.
Figure 2:
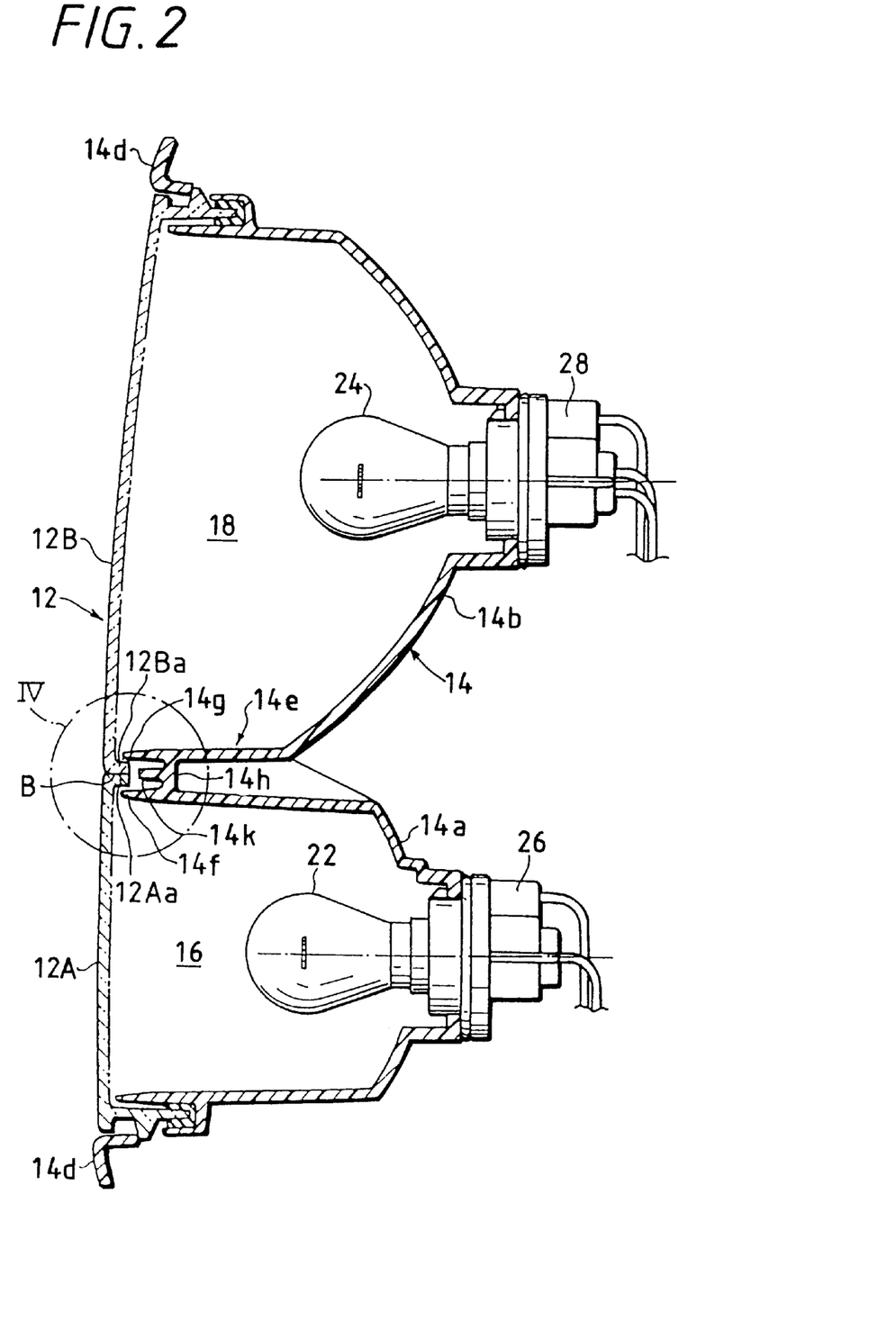
FIG. 2 is a section view taken along the line II—II of FIG. 1.
Figure 3:
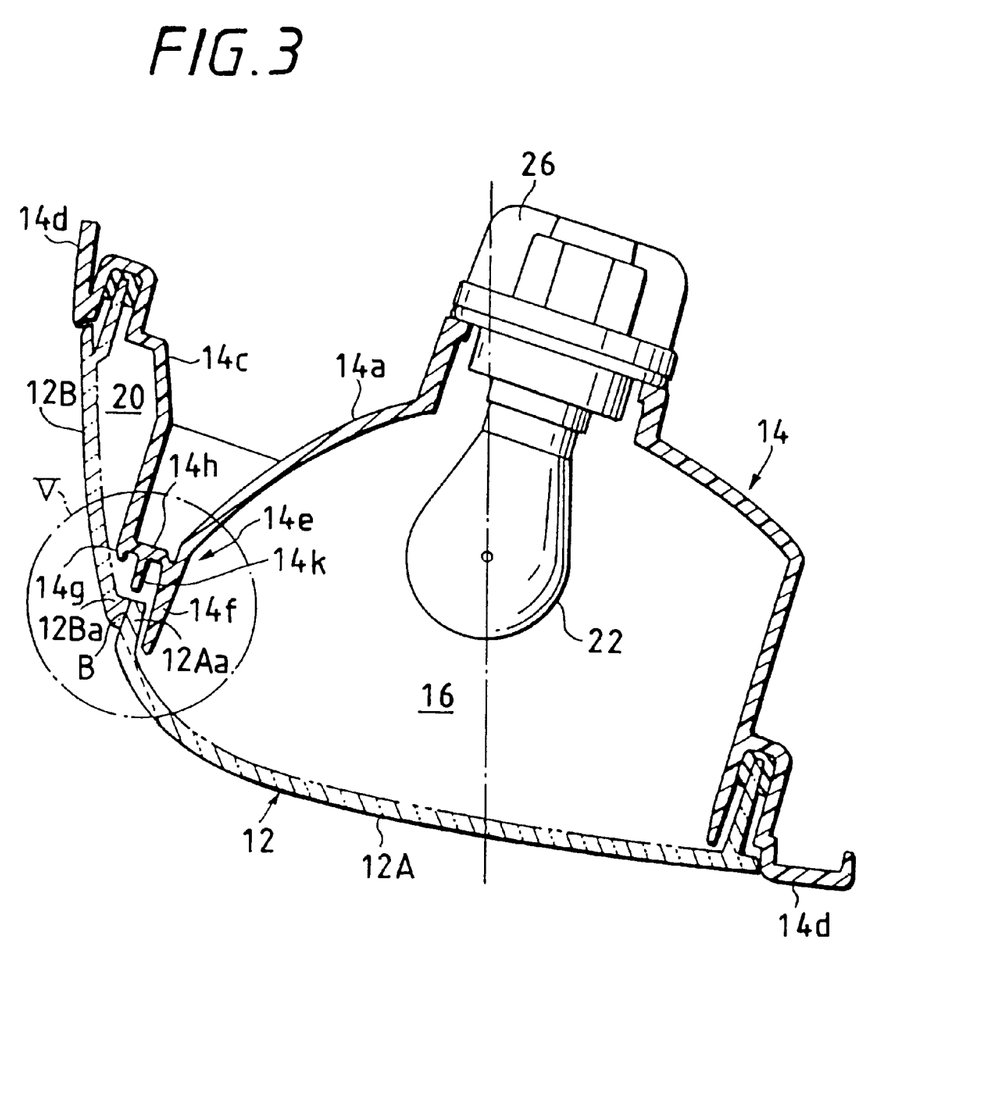
FIG. 3 is a section view taken along the line III—III of FIG. 1.

FIG. 1 is a front view showing a vehicular lamp which is an embodiment of the invention, and FIGS. 2 and 3 are section views taken along the lines II—II and III—III of the figure, respectively.

As shown in FIG. 1, the lamp 10 of the embodiment is a rear combination lamp which is to be mounted in the rear end of a vehicle body (for the left side of the vehicle, for instance), and functions as a turn signal lamp and a tail and stop lamp. In the lamp 10, a lower lamp housing 16 and an upper lamp housing 18, which are vertically arranged, are formed by a joined lens 12 and a lamp body 14 which is disposed in rear of the lens (the term "rear" means the rear side of the lamp, and toward the front side from the view point of the vehicle body, and this is applied also to the following description).

The lower lamp housing 16 is used as a lamp housing for a turn signal lamp. The upper lamp housing 18 which is adjacent to and above the lower lamp housing 16 is used as a lamp housing for a tail and stop lamp. The lower end of the upper lamp housing 18 is formed so as to extend to the side of the lower lamp housing 16, thereby forming a dummy lamp housing 20 (a space for decoration) in the side of the lower lamp housing.

Light bulbs 22 and 24 are disposed in the lower and upper lamp housings 16 and 18, respectively. No light bulb is disposed in the dummy lamp housing 20. The light bulb 22 is an amber bulb, and the light bulb 24 is a clear bulb.

The joined lens 12 is configured by joining a first lens portion 12A of a clear lens, with a second lens portion 12B of a red lens. The first lens portion 12A is positioned so as to configure the front face of the lower lamp housing 16. The second lens portion 12B is formed into an L-like shape so as to surround the first lens portion 12A, thereby constituting the front faces of the upper lamp housing 18 and the dummy lamp housing 20.

According to this configuration, in the lower lamp housing 16, a light beam from the light bulb 22 of an amber bulb is transmitted through the first lens portion 12A of a clear lens, thereby obtaining amber illumination light of a turn signal lamp. In the upper lamp housing 18, a light beam from the light bulb 24 of a clear bulb is transmitted through the second lens portion 12B of a red lens, thereby obtaining red illumination light of a tail and stop lamp.

In the first and second lens portions 12A and 12B, as shown in FIG. 2, flanges 12A*a* and 12B*a* which extend rearwardly are formed in ends of the lens portions are joined to each other. This joining is performed with using the outer side faces of the flanges 12A*a* and 12B*a* as joining faces B.

As shown in FIG. 3, the joined lens 12 is largely curved toward the rear side in the vicinity of the outer end in the width direction of the vehicle body. With respect to the lower lamp housing 16 and the dummy lamp housing 20, the joined lens is largely curved toward the rear side as moving from the vicinity of the outer end of the lower lamp housing 16 to the dummy lamp housing 20.

In the lamp body 14, as shown in FIGS. 2 and 3, a lower reflector 14*a* constituting the rear face of the lower lamp housing 16, an upper reflector 14*b* constituting the rear face of the upper lamp housing 18, and a dummy reflector 14*c* constituting the rear face of the dummy lamp housing 20 are integrally formed.

As shown in FIG. 2, the light bulb 22 is inserted into the lower reflector 14*a* through a socket 26 so that a light beam from the light bulb 22 is reflected toward the front side of the lamp housing. Similarly, the light bulb 24 is inserted into the upper reflector 14*b* through a socket 28 so that a light beam from the light bulb 24 is reflected toward the front side of the lamp housing.

An outer peripheral flange 14*d* which surrounds the joined lens 12 so as to be substantially flush with the joined lens 12 is formed in the outer peripheral end of the lamp body 14. A border portion 14*e* which separates the lower reflector 14*a* from the upper reflector 14*b* and the dummy reflector 14*c* is formed in the lamp body 14.

The front end of the border portion 14*e* is formed into a groove-like structure which has a U-like section shape and which is configured by a pair of elongated walls 14*f* and 14*g* and a bottom face 14*h* between the elongated walls 14*f* and 14*g*. The elongated wall 14*f* extends along the inner side face of the flange 12A*a* of the first lens portion 12A, to a position which is more forward than the rear end face of the flange 12A*a*. On the other hand, in the area between the lower reflector 14*a* and the upper reflector 14*b*, the elongated wall 14*g* extends along the inner side face of the flange 12B*a* of the second lens portion 12B, to a position which is more forward than the rear end face of the flange 12B*a*. As described above, the joined lens 12 is largely curved toward the rear side in the vicinity of the joining faces B. In the area between the lower reflector 14*a* and the dummy reflector 14*c*, therefore, the elongated wall 14*g* forwardly projects from the bottom face 14*h* only by a small length in order to avoid interference with the second lens portion 12B.

As shown in FIGS. 2 and 3, a rib 14*k* is formed at an intermediate position in the front end of the border portion 14*e* and between the pair of elongated walls 14*f* and 14*g*. The rib extends in a direction that is substantially parallel with the elongated walls 14*f* and 14*g* and to a position in the vicinity of the rear ends of the joining faces B of the lens 12. The rib 14*k* is formed so as to be substantially flush with the joining faces B (that is, so that an extended plane of the joining faces B is a plane passing through the thickness of the rib 14*k*), in such a manner that, in the area between the lower lamp housing 16 and the upper lamp housing 18, the thickness is equally distributed in the vertical direction with respect to the extended plane of the joining faces B, and, in the area between the lower lamp housing 16 and the dummy lamp housing 20, the thickness is biased to the side of the dummy lamp housing 20.

As described above in detail, in the embodiment, a direct light beam which is directed from the light bulb 22 of the lower lamp housing 16 toward the second lens portion 12B is blocked by the elongated wall 14*f*, and a direct light beam which is directed from the light bulb 24 of the upper lamp housing 18 toward the first lens portion 12A is blocked by the elongated wall 14*g*, so that suppression of light leakage between the lamp housings can be attained to a certain degree. However, a light beam which travels in the lens 12 cannot be blocked by the elongated walls 14*f* and 14*g*.

To comply with this, in the embodiment, the rib 14*k* which extends in a direction that is substantially parallel with the elongated walls 14*f* and 14*g* and to a position in the vicinity of the rear ends of the joining faces B of the lens 12 is formed at an intermediate position in the front end of the border portion 14*e* and between the pair of elongated walls 14*f* and 14*g*. This configuration can attain the following effect.

Figure 4:
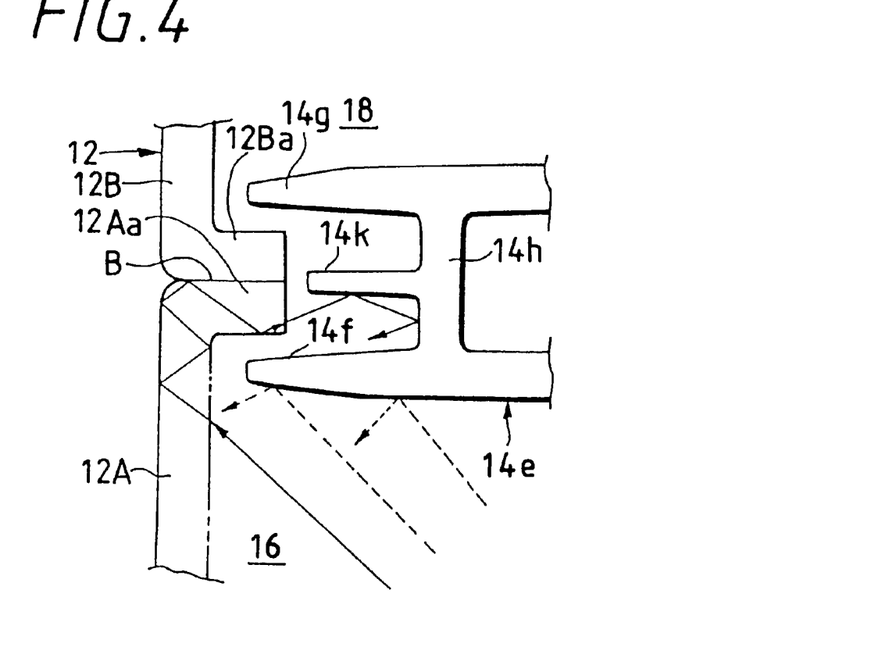
FIG. 4 is a detail view of the area IV in FIG. 2.

As shown in FIG. 4, a light beam which is emitted from the light bulb 22 of the lower lamp housing 16 and enters a portion in the vicinity of the upper end of the first lens portion 12A (i.e., the vicinity of the end on the side of the joining faces) is blocked by the rib 14*k* when the light beam travels in the first lens portion 12A and then outgoes from the rear end face of the flange 12A*a*, or when the light beam is thereafter reflected by the bottom face 14*h* or the elongated wall 14*f*. As a result, light is prevented from entering the second lens portion 12B.

In the area between the lower lamp housing 16 and the upper lamp housing 18, the border portion 14*e* of the lamp body 14 is formed so as to be vertically symmetrical. Therefore, a light beam which is emitted from the light bulb 24 of the upper lamp housing 18 and enters a portion in the vicinity of the lower end of the second lens portion 12B (i.e., the vicinity of the end on the side of the joining faces) is blocked by the rib 14*k* when the light beam travels in the second lens portion 12B and then outgoes from the rear end face of the flange 12B*a*, or when the light beam is thereafter reflected by the bottom face 14*h* or the elongated wall 14*g*. As a result, light is prevented from entering the first lens portion 12A.

Figure 5:
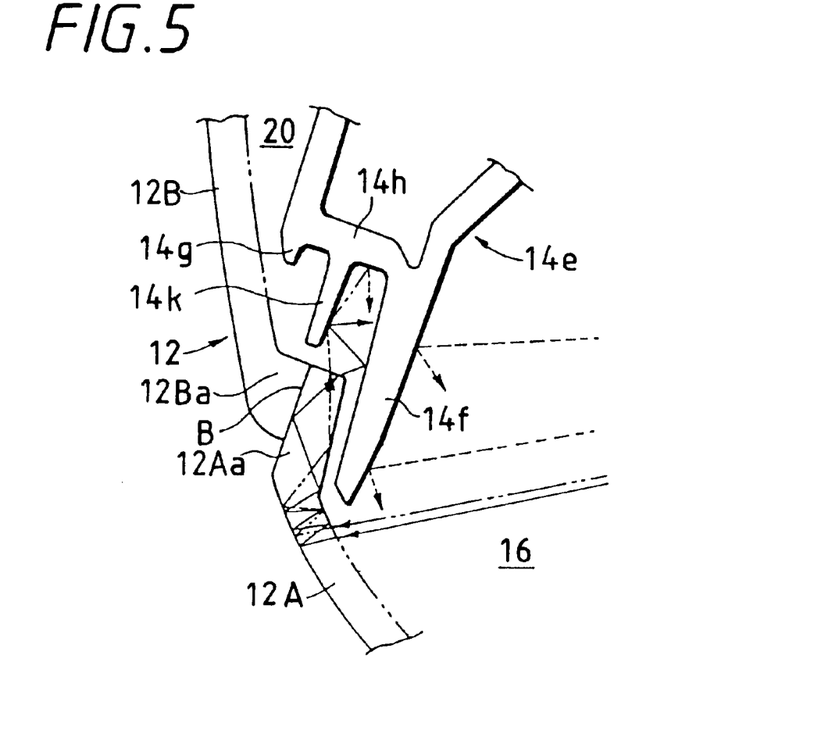
FIG. 5 is a detail view of the area V in FIG. 3.

As shown in FIG. 5, also a light beam which is emitted from the light bulb 22 of the lower lamp housing 16 and enters a portion in the vicinity of the side end of the first lens portion 12A (i.e., the vicinity of the end on the side of the joining faces) is blocked by the rib 14*k* when the light beam travels in the first lens portion 12A and then outgoes from the rear end face of the flange 12A*a*, or when the light beam is thereafter reflected by the bottom face 14*h* or the elongated wall 14*f*. As a result, light is prevented from entering the second lens portion 12B.

According to the embodiment, therefore, in the lamp in which the two adjacent lamp housings are formed by the joined lens and the lamp body, light leakage between the lamp housings can be sufficiently suppressed.

There is a possibility that a light beam which is emitted from the rear end face of the flange 12A*a* of the first lens portion 12A or that of the flange 12B*a* of the second lens portion 12B and then reflected by the tip end face of the rib 14*k* enters the second lens portion 12B or the first lens portion 12A. However, the amount of such light is so small that it does not produce a serious problem of light leakage.

In the embodiment, particularly, the joined lens 12 is formed so as to be largely curved rearwardly from the first lens portion 12A to the second lens portion 12B. Therefore, the elongated wall 14g in the border portion 14e and on the side of the dummy lamp housing 20 is formed as a very low wall wherein the front end is at a position which is more rearward than the front end of the rib 14k. If the rib 14k is not formed, a light beam reflected by the bottom face 14h of the lamp body 14 or by the elongated wall 14f on the side of the lower lamp housing 16 directly enters the lens face of the second lens portion 12B. In the embodiment, since the rib 14k is formed, such light leakage can be prevented from occurring.

In the embodiment described above, the rear end face of the flange 12Aa of the first lens portion 12A is flush with that of the flange 12Ba of the second lens portion 12B. Alternatively, the rear end faces may be structured so as to form a stepped shape. When configured in the same manner as described above, the alternative also can attain the identical effects as the embodiment described above.

What is claimed is:

1. A vehicular lamp with a first lamp housing and a second lamp housing adjacent to each other, comprising:
    a joined lens including,
        a first lens portion for said first lamp housing,
        a second lens portion for said second lamp housing, and
        first and second flanges respectively extending rearwardly from ends of said first and second lens portions, each of said flanges including an outer surface, an inner surface, and a rear end face,
        wherein said first lens and second lens portions are joined to each other by the outer surfaces of said flanges; and
    a lamp body provided adjacent to said joined lens, said lamp body including,
        a border portion dividing said lamp body into said first and second lamp housings,
        an elongated wall formed in said border portion of said lamp body, said elongated wall extending along an inner surface of said first flange to a position which is more forward than said rear end face of said first flange, and
        a rib formed in said border portion of said lamp body, said rib extending in a direction that is substantially parallel with said elongated wall and extending to a position in the vicinity of where said outer surfaces of said flanges are joined together.

2. The vehicular lamp according to claim 1, wherein said rib extends so as to be substantially flush with said outer surface of each of said flanges.

3. The vehicular lamp according to claim 1, further comprising a second elongated wall formed in said border portion of said lamp body, said second elongated wall extending in a direction that is substantially parallel to said rib and extending to a position that is spaced a greater distance from said rear end faces of said flanges than a distance by which said rib is spaced from the rear end faces of said flanges.

4. The vehicular lamp according to claim 1, wherein said joined lens is curved rearwardly from said first lens portion to said second lens portion.

5. The vehicular lamp according to claim 1, further comprising:
    a first light bulb disposed in said first lamp housing; and
    a second light bulb disposed in said second lamp housing.

6. The vehicular lamp according to claim 1, further comprising:
    a first light bulb disposed in said first lamp housing, wherein said second lamp housing is a dummy lamp housing.

7. The vehicular lamp according to claim 1, wherein said lamp body further comprises a second elongated wall formed in said border portion of said lamp body, said second elongated wall extending along an inner surface of said second flange to a position which is more forward than said rear end face of said second flange.

8. The vehicular lamp according to claim 1, wherein said first and second lens portions are different in color from each other.

* * * * *